United States Patent [19]

de Niet

[11] 3,832,487

[45] Aug. 27, 1974

[54] METHOD OF CONVERTING IMAGE SIGNALS GENERATED IN A NON-INTERLACED MANNER INTO IMAGE SIGNALS INTERLACED IN ACCORDANCE WITH A TELEVISION STANDARD

[75] Inventor: Edmond de Niet, Emmasingel, Eindhoven, Netherlands

[73] Assignee: U.S. Philips Corporation, New York, N.Y.

[22] Filed: Nov. 29, 1972

[21] Appl. No.: 310,344

[30] Foreign Application Priority Data

Dec. 21, 1971 Netherlands ....................... 7117542

[52] U.S. Cl. ........................... 178/7.2, 178/DIG. 24

[51] Int. Cl. ............................................ H04n 5/02

[58] Field of Search ............... 178/DIG. 24, 7.1, 7.2, 178/7.6, 7.7, 69.5 TV, 69.5 R

[56] References Cited

UNITED STATES PATENTS 3,585,293 6/1971 Crowder ............................. 178/7.2

3,700,795 10/1972 Eckenbrecht ........................ 178/7.2

*Primary Examiner*—Benedict V. Safourek

*Attorney, Agent, or Firm*—Frank R. Trifari; Henry I. Steckler

[57] ABSTRACT

A method of converting image signals $L_1, L_2 L_3 \ldots L_n$ generated in a non-interlaced manner for standard display into interlaced signals $L_1, L_3 \ldots$ and $L_2, L_4 \ldots$ The image signals are split up into three groups $L_1, L_4 \ldots L_2, L_5 \ldots$ and $L_3, L_6 \ldots$ whereafter the duration of occurrence of the image signals is extended from one line period to two subsequent line periods. Subsequently two groups of image signals $L_1, L_3, L_5 \ldots$ and $L_2, L_4, L_6 \ldots$ occurring for two line periods are formed which are separately and simultaneously written in a store. By reading out the store at a rate which is twice as fast signals which are interlaced in accordance with the standards become successively available.

10 Claims, 2 Drawing Figures

PATENTED AUG 27 1974

3,832,487

SHEET 1 OF 2

Figure 1:
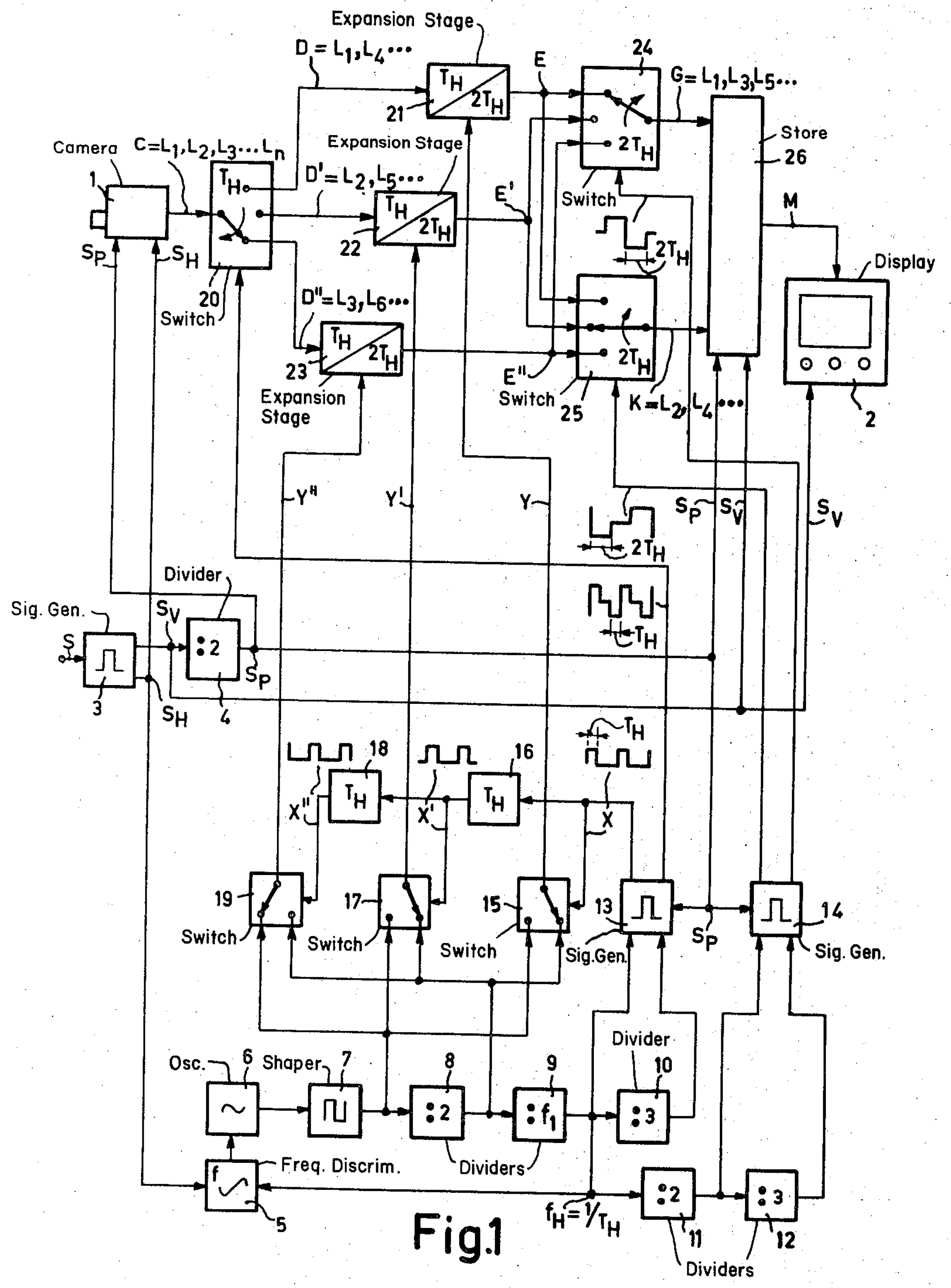

METHOD OF CONVERTING IMAGE SIGNALS GENERATED IN A NON-INTERLACED MANNER INTO IMAGE SIGNALS INTERLACED IN ACCORDANCE WITH A TELEVISION STANDARD

The invention relates to a method of converting image signals generated in a non-interlaced manner into image signals interlaced in accordance with a television standard, in which a group of image signals $L_1$, $L_2$, $L_3$ , . . $L_n$ successively generated in a non-interlaced manner during line periods, with $n$ being equal to the odd number of line periods covering a picture period which according to the standard is equal to two field periods, is converted into two groups of image signals $L_1$, $L_3$, $L_5$ . . . and $L_2$, $L_4$, $L_6$ . . . successively occurring during two field periods, and to an arrangement suitable for performing the method.

In given cases it is favourable to perform the line scanning in a non-interlaced manner during the standard picture period when the image signal is generated. To avoid the use of separate display arrangements adapted thereto which have the known drawback of a flickering picture, the signal conversion is required in order that the standard television display apparatus employing line interlacing can be used for display. Scanning of the lines in a non-interlaced manner for generating the image signal is desired, for example, when a scene is picked up only once. In this case the light coming from the scene is active for some time, for example, several seconds in a camera tube present in a television camera in which a potential image corresponding to the scene is obtained through integration of light with respect to time. Subsequently the potential image is scanned in a non-interlaced manner by an electron beam during a picture period which lasts, for example, 40 or 33.3 ms dependent on the television standard and is converted into the group of image signals $L_1$, $L_2$, $L_3$, . . . $L_n$ occurring during line periods. To be able to perform a repeated display the image signals are to be stored in a store. Prior to or after storage the signals are to be converted into the two groups of interlaced image signals $L_1$, $L_3$, $L_5$ . . . and $L_2$, $L_4$, $L_6$ . . .

When, however in contrast with the case described the signals are generated by scanning the lines in an interlaced manner, the display on one and the same display apparatus shows that the result is a picture of clearly lesser quality in definition than the picture which is obtained after the non-interlaced line scan during generation of the signals and the subsequent signal conversion. The cause thereof resides in the magnitude of the diameter of the scanning electron beam. In practice the diameter is so large that there is no free space between two lines in the potential image successively scanned in a field. If there had been a free space the information in the potential image would have been retained in this space until the intermediate line would be scanned in the next field. Since this is not the case in practice, the result is that only the first field in a picture period provides satisfactory image signals and that the second field does not provide any signal or very weak signals. Upon display a picture appears which is built up of approximately half the normal number of lines; poor definition in the displayed picture is the result.

When successively picking up the scene instead of picking it up only once, as described, a better definition is found to be obtained relative to interlaced picking up and display even when generating the signals in a non-interlaced manner and when displaying in an interlaced manner after conversion. There is crosstalk between the directly generated image signals $L_1$, $L_3$, $L_5$ . . . of the odd field and $L_2$, $L_4$, $L_6$ . . . of the even field and an effective light integration period of one field period applies to each image spot, while for the non-interlaced scanning during conversion this crosstalk down not occur and a twice as large light integration period of one picture period applies for each image spot.

The described improvement in definition is particularly important in case of professional applications of television in which stringent requirements are imposed on the clearness of the details displayed. For example, for medical or non-medical X-ray television and microscopy television and when attending surgical operations through televisions. So far the drawbacks of a possible signal conversion have weighed heavier than the described advantages obtained by generating the signals in a non-interlaced manner.

The object of the invention is to provide a method for a simple conversion of non-interlaced generated signals into interlaced signals for display so that the advantage of a better picture definition upon display is decisive relative to extra acceptable signal conversion equipment. To this end the method according to the invention is characterized in that the group of image signals $L_1$, $L_2$, $L_3$, . . . $L_n$ generated in a non-interlaced manner is split up into three groups of image signals $L_1$, $L_4$, $L_7$ . . . $L_2$, $L_5$, $L_8$ . . . and $L_3$, $L_6$, $L_9$ . . . which subsequently each undergo an expansion with time so that, while occurring within a duration of one line period, they are extended to signals occurring within a duration of two subsequent line periods, said three groups of image signals $L_1$, $L_4$, $L_7$ . . . ; $L_2$, $L_5$, $L_8$ . . . and $L_3$, $L_6$, $L_9$ . . . extending to two line periods being composed to form two groups of image signals $L_1$, $L_3$, $L_5$ . . . and $L_2$, $L_4$, $L_6$ . . . occurring in two line periods, said groups being simultaneously written in at a given rate and each at its own location in a store, whereafter for the purpose of signal display the store is read out at twice as fast a rate so that the store provides in one group successively the two groups of image signals $L_1$, $L_3$, $L_5$ . . . and $L_2$, $L_4$, $L_6$ . . . occurring in one line period and interlaced in accordance with the standard.

An arrangement suitable for performing the method described is characterized in that the arrangement is provided with a controlled change-over switch formed with an input which constitutes an input of the arrangement and with three outputs each connected to a different expansion stage, the outputs of said three expansion stages being connected to three inputs of each of two controlled change-over switches which are each provided with an output for connection to the store having separate signal storage.

Figure 2:
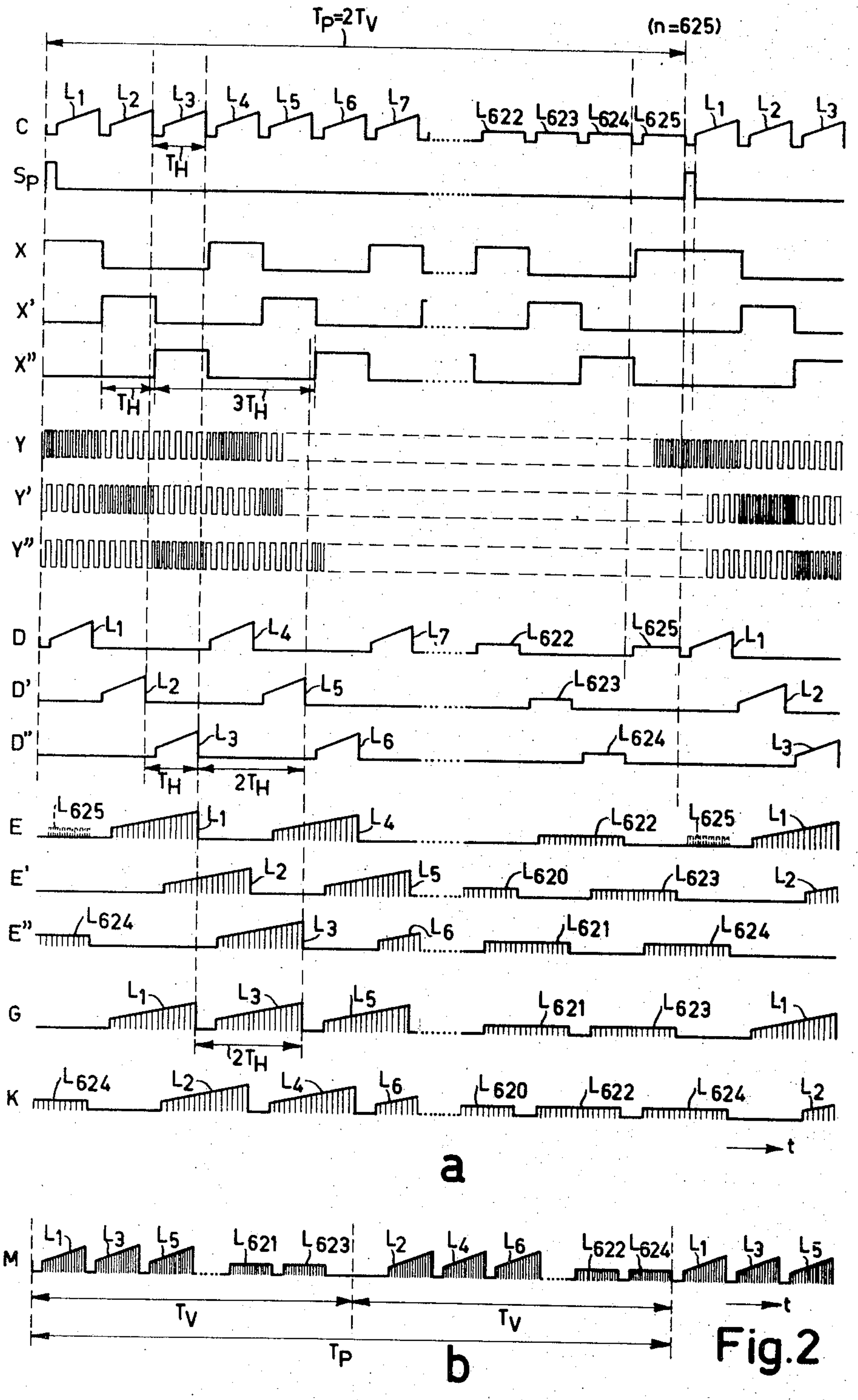

The invention will be described in greater detail with reference to the following Figures as examples in which:

FIG. 1 shows an embodiment of an arrangement which is suitable for use of the method according to the invention, and FIG. 2 shows some signals locally indicated in FIG. 1 as a function of time for the purpose of explaining the method.

In FIG. 1, 1 denotes a television camera and 2 denotes a television display apparatus. The signals which are generated in a non-interlaced manner by camera 1 and which are to be displayed in an interlaced manner by the arrangement 2 operating in accordance with a television standard are converted by using the method according to the invention. To explain this signal conversion reference is made to FIG. 2 which will be described in conjunction with the arrangement according to FIG. 1. The arrangement shown in FIG. 1 may generally be used for different television standards such as the CCIR, the RTMA-standard etc., while for the sake of simplicity the signals according to FIG. 2 are shown as occurring for the CCIR-standard.

The camera 1 provides a group of image signals $C = L_1, L_2, L_3 \ldots L_n$ and the enumeration of the lines (L) shown that scanning in a camera tube present in camera 1 is effected in a non-interlaced manner. Camera 1 may operate, for example, for an X-ray photograph in which X-ray radiation is converted into light being picked up as it originates from a scene. A microscopic scene can be picked up by camera 1 when it is coupled to a microscope. Further professional uses of television circuits in which an image of the scene having satisfactory details is required are possible.

In FIG. 2*a*, C shows the group of image signals with $n$ = 625 for the CCIR-standard line number represented in a diagrammatical form. For the RTMA-standard $n$ would be 525. The signals $L_1 \ldots L_{625}$ are successively generated in a picture period $T_p$ which is equal to two standard field periods $T_V$ and which lasts 40 and 33.3 ms, respectively, for the said standards. $T_H$ denotes a line period which is subdivided in a manner not shown into a line scan period and a line blanking period. For the signal C shown a linearly increasing signal part in the image signals $L_1 \ldots L_7$ occurs during the line scan period and a positively directed pulse occurs in the signals $L_{622} \ldots L_{625}$. The image signals $L_1 \ldots L_7$ correspond to a scene in which a linearly increasing light intensity occurs as viewed in the line scan direction. The signals $L_{622} \ldots L_{625}$ actually do not comprise any scene information but form part of those lines which, according to the standard, occur in a field blanking period not shown and occupy, for example, a number of 21 lines. For the sake of clarity the signals $L_{622} \ldots L_{625}$ are shown with pulses as pseudo-information.

A subsequent picture period may follow the given picture period $T_p$. As has been described, it is alternatively possible to pick up a scene only once during one picture period $T_p$ instead of picking up a scene incessantly in cycles of picture periods $T_p$. Apart from this fact it is desired to convert the signal C with the group of non-interlaced image signals $L_1 \ldots L_{625}$ according to FIG. 2*a* into a signal M shown in FIG. 2*b* which provides the image signals $L_1, L_3, L_5 \ldots$ and $L_2, L_4, L_6 \ldots$ interlaced in accordance with the standard and suitable for display, It is to be noted that for the method according to the invention one line information ($L_{625}$) diagrammatically shown at signal C is lost, which is admissible because it occurs during the said field blanking period, and that a high frequency signal sampling has taken place. Line synchronizing pulses present during the line blanking periods are not shown in the signals C of FIG. 2*a* and M of FIG. 2*b* because they are irrelevant for the description of the invention, but in practice they may be present.

For performing the method synchronizing signals are required for the arrangement according to FIG. 1, for the camera 1 and the display apparatus 2. S denotes a synchronizing signal in FIG. 1 which is applied to a signal generator 3. The signal S may have any composition and may be, for example, a digitally coded signal. In any case generator 3 generates synchronizing signals and $S_H$ denotes a line synchronizing signal and $S_V$ denotes a field synchronizing signal. A picture synchronizing signal $S_p$ is derived from the field synchronizing signal $S_V$ through a 2-to-1 divider 4. An example of the picture synchronizing signal $S_p$ is shown in FIG. 2*a*. The signals $S_H$ and $S_V$ laid down for the standard are not shown. The signal generator 3 and the 2-to-1 divider 4 are active as a synchronizing signal generator (3, 4).

The synchronizing signals $S_p$ and $S_H$ are applied to camera 1 so that an electron beam present in a camera tube not shown constitutes a line scanning raster in a non-interlaced manner. To stress the fact that the display arrangement 2 according to the standard is operative in an interlaced manner it has been shown that for field synchronisation the signal $S_V$ is applied thereto. The line synchronization of the display arrangement 2 may be effected through the line synchronizing pulses present in the signal M and being not shown for the sake of simplicity.

For further synchronization purposes the signals $S_H$ and $S_P$ from the synchronizing signal generator (3, 4) are utilized as follows. The signal $S_H$ from generator 3 is applied to a frequency discriminator 5 whose output is connected to an oscillator 6 which is connected through a clock pulse shaper 7 and two series arranged frequency dividers 8 and 9 to a further input of the discriminator 5. The divider 9 provides a signal of the standard line frequency denoted by $f_H = 1/T_H$. A divider 10 and a series arrangement of two dividers 11 and 12 follow divider 9.

Inputs of a signal generator 13 are connected to the divider 9 and to the 3-to-1 divider 10. Inputs of a signal generator 14 are connected to the 2-to-1 divider 11 and the 3-to-1 divider 12. For further control purposes the signal generators 13 and 14 receive the signal $S_p$ from the 2-to-1 divider 4. The signal generator 13 generates a pulsatory signal having a duration of $T_H$ denoted by X in a repetition period of 3 $T_H$ as is shown in FIG. 1 and a step-shaped signal having a (step) duration of $T_H$ which is shown but is not further denoted. Likewise, through with a repetition period of $6T_H$ and a (step) duration of 3 $T_H$ signal generator 14 generates two step-shaped signals shown in FIG 1. The signals generated by signal generator 13 and 14 are shown in their phase relation in FIG. 1.

The signal X is utilized for switching purposes and to this end it is directly applied to a controlled change-over switch 15, through a delay stage 16 to a second change-over switch 17 and through another delay stage 18 to a third change-over switch 19. X′ and X″ denote the signals which are supplied with a delay duration of 1 $T_H$ and 2 $T_H$ by the stages 16 and 18, respectively. The change-over switches 15, 17 and 19 are each formed with two inputs one of which is connected to the clock pulse shaper 7 and the other is connected to the 2-to-1 divider 8. The respective change-over switches 15, 17 and 19 each have an output which convey signals denoted by Y, Y′ and Y″, respectively. Although the change-over switches 15, 17 and 19 and switches to be further described are shown as mechanical switches, they are preferabl formed electronically.

FIG. 2*a* shows the signals X, X′, X″, Y, Y′, and Y″. The clock pulse shaper 7 which is formed, for example, as a 2-to-1 divider provides clock pulses derived from the oscillator signal from oscillator 6, which pulses occur successively during a line period $T_H$ in the signals Y, Y' and Y''. For the signal X'' the repetition period is denoted by 3 $T_H$. The edges in the signals X, X' and X'' are shown as occurring during the line blanking periods. The positions of the controlled switches 15, 17 and 19 shown in FIG. 1 occur during those line periods when the image signals $L_3, L_6, \ldots L_{624}$ shown at signal C occur. Instead of the delay periods $T_H$ between the successive signals X, X' and X'' being provided by the stages 16 and 18 which may be formed, for example, as monostable multivibrators or delay lines, signal generator 13 may alternatively provide the signals X, X' and X'' directly.

For performing the method according the the invention FIG. 1 shows the camera 1 which provides the group of image signals $C = L_1, L_2, L_3 \ldots L_n$ connected to an input of a controlled change-over switch 20 which is provided with three outputs. Since the signal generator 13 applies the step-shaped signal having the (step) duration of 1 $T_H$ for the purpose of switching to the change-over switch 20, the input is successively connected during a line period $T_H$ to one of the three outputs. The group of image signals $C = L_1, L_2, L_3 \ldots L_n$ is split up through switch 20 into three groups of image signals which are denoted by $D = L_1, L_4, \ldots ; D' = L_2, L_5 \ldots$ and $D'' = L_3, L_6 \ldots$ in FIG. 1. In FIG. 2a the signals $D$, $D'$, and D'' are plotted as they follow from the signal $C$ shown.

The signals D, D' and D'' are applied to expansion stages 21, 22 and 23, respectively, to which furthermore the signals Y, Y' and Y'' are applied for control purposes. The operation of the expansion stages 21, 22 and 23 is such that the image signals applied thereto and occurring within the duration of a line period $T_H$ are extended through a signal sampling to signals occurring within a duration of two subsequent line periods 2 $T_H$. FIG. 2a shows the result of the conversion of the signals D, D' and D'' into the signals E, E' and E'', respectively. A sampled signal is diagrammatically shown in solid lines.

The following applies for an embodiment of the expansion stages 21, 22 and 23. The expansion stage 23 is formed, for example, in a manner not shown with a circuit of capacitors between which a charge transfer can take place through semiconductors controlled by the clock pulses in the signal Y''. A unit of this kind is described as a so-called bucket-brigade delay line inter alia in U.S. Pat. No. 3,546,490. To understand the operation it is important that under the control of clock pulses provided by clock pulse generator (6, 7) samples of the provide signal D'' are taken during a line period $T_H$ (for example image signals $L_3$) which samples are successively shifted through the capacitor circuit. During two subsequent line periods, $2T_H$, the clock pulses (signal Y'') provided by 2-to-1 divider 8 of FIG. 1 are applied to the expansion stage 21 and the result is that the written image signal $L_3$ becomes available at half the writing rate at the output of the stage 21.

Similarly the other image signals $L_1$, $L_2$; $L_4 \ldots L_{624}$ are obtained in the signals E, E' and E'' shown in FIG. 2a. An exception occurs for the signal $L_{624}$. Due to the split-up in three paths obtained through change-over switch 20, $(n/3) = (624/3) = 208 \frac{1}{3}$ cycles are obtained for one picture period $T_p$. It is found that the image signal $L_{625}$ is beyond the entire period for a subsequent picture period $T_p$ a start is made with the image signal $L_1$ as the first image signal.

This problem can be solved through the synchronizing signal $S_p$ in the manner shown in FIG. 2a for the signals X, X' and X''. The supply of signal $S_p$ to the generators 13 and 14 provides these signals in which there is no signal variation at the time of the pulse in the signal $S_p$ as is the case shown for the signals X and X' in FIG. 2a. Instead of changing over the switches 15 and 17 and also 20, they remain in the same position. The result is that the image signal $L_{625}$ of the signal D written in in the expansion stage 21 at a fast rate is read out at a fast rate again during the next line period while the image signal $L_1$ is written in simultaneously. The sampled rapidly read out signal $L_{625}$ is shown in signal E, as well as the signal $L_1$ slowly read out during the next two line periods.

The acyclic problem does not occur in the 525 line standard because then $(n/3) = 525/3 = 175$ entire cycles occur so that the signal $S_p$ for the described purpose need not be applied to the generators 13 and 14. The same applies to an $n$-line standard with $n = 405$ or 819.

The three groups of signals E, E' and E'' are to be composed in accordance with the method to form two groups. The arrangement according to FIG. 1 is to this end provided with two controlled change-over switches 24 and 25 which are each formed with three inputs and one output. An input of each of the change-over switches 24 and 25 is connected to an output of the expansion stages 21, 22 and 23. For control purposes the change-over switches 24 and 25 are connected to one of the two outputs of the generator 14 and the step-shaped change-over signal shown in FIG. 1 determines the position of the switch. The position of the switches 24 and 25 shown, likewise as that of the switches 15, 17, 19 and 20, is associated with the third line period ($L_3$) taken as an example and it can be deduced from the change-over signals shown in FIG. 1 that the change-over switch 24 changes over upon transition to the fourth line period while switch 25 changes over at the transition from the fifth to the sixth line period. Each line period $T_H$ one of the switches 24 and 25 switches and remains subsequently in the same position during two line periods 2 $T_H$; all this in a cycle of six line periods.

In the manner described the change-over switches 24 and 25 of FIG. 1 apply the groups of signals $G = L_1, L_3, L_5 \ldots L_{621}, L_{623}$ and $K = L_2, L_4 \ldots L_{622}, L_{624}$ shown in FIG. 2a to the single outputs. The signal $L_{625}$ does not occur in signal G because during the line period of occurrence in the signal E the switching member of the change-over switch 24 remains connected to the expansion stage 22 under the influence of the supply of the signal $S_p$ from the generator 14 and changes over after a delay of one line period. The other switches 15, 17, 19, 20 and 25 likewise have a delay of one line period. As is noted such a delay is not necessary when the number of lines $n$ of a standard can be divided by three.

The output of change-over switches 24 and 25 are connected to an input of a store 26. Under the control of the synchronizing signals $S_p$ and $S_{l'}$ likewise applied thereto the signals G and K are separately stored in store 26 and subsequently they are rendered available by the store 26 for further processing. As is shown in FIG. 1 an output of store 26 may be connected to the display arrangement 2.

For performing the method it is important that the store 26 stores the signals G and K in accordance with FIG. 2a simultaneously at a given rate in their own location and renders these signals successively available for signal display at a rate which is twice as fast. The result is shown in FIG. 2b by means of the signal M. Any store providing this possibility may be used. One embodiment of the store 26 is a magnetic disc store. The information provided in signals G and K of FIG. 2a is then stored in a parallel manner in two magnetic tracks while the disc store has, for example, 1,500 rpm. When reading out is subsequently effected at a disc rate of 3,000 rpm and the magnetic tracks are read out one after the other, the signal M of FIG. 2b is the result. The picture synchronizing signal $S_p$ may perform, for example, a switching-on switching-off function for the store 26 while the field synchronizing signal $S_F$ (FIG. 1) has a change-over function between the one and the other magnetic track. Instead of operating the storage disc itself at two alternating rotational rates it is alternatively possible for a disc rate of 1,500 rpm to give the read-out heads in the opposite direction the same rate with stationary write heads.

One output conveying the signal M of the store 26 is connected to the display arrangement 2. This implies that the change-over from one to the other store location or track is effected in store 26 itself. Changing over may of course be effected outside the store in case of an embodiment using plurality of outputs.

As described, the line synchronizing pulses are not shown for the sake of simplicity in the signals of FIG. 2. Since FIG. 1 shows that only the field synchronizing signal $S_F$ is applied to the display arrangement 2, the signal M to be displayed is to comprise the line synchronizing pulses. It is possible to add the line synchronizing pulses to the signal M provided by store 26 before supply to the display arrangement 2.

In the embodiment using the magnetic disc store a writing rate of 1,500 rpm is mentioned. A signal storage having a possible bandwidth of 2.5 MHz corresponds thereto. Since in the method shown the signals D, D' and D'' separated from signal C undergo the time expansion with a factor of two via the expansion stages 21, 22 and 23, a possible bandwidth of 2×2.5 = 5 MHz follows for the signal C. By reading out the store 26 at a rate which is twice as fast the signal M acquries the same bandwidth of 5 MHz. The signal M is a sampled signal so that also the signal sampling is to be effected at the expansion stages 21, 22 and 23 for this bandwidth. A division number $f_1$ of the frequency divider 9 in FIG. 1 may be determined as follows.

It is known from the information technique that when a signal to be sampled occurs for a time duration T and a signal obtained by sampling must have a bandwidth of W, 2 T.W signal samples are to be taken at a clock pulse frequency of 2 W. It follows that 640 samples are to be processed at a clock pulse frequency of 10 MHz in order to obtain a 5 MHz signal in the line period $T_H$ of, for example, 64$\mu$s (CCIR-standard). Consequently, the clock pulses provided by clock pulse generator (6, 7) must have a frequency of approximately 10 MHz. Since $2f_1$ samples are taken to be equal to 640 during the line period $T_H$, there follows that $f_1 = 320$. The frequency divider 9 with the division number of $f_1 = 320$ may be formed as a combination of dividers.

For the described bucket-brigade delay line embodiment of the expansion stages 21, 22 and 23 there applies that it must be able to comprise the 640 samples. Since the picture information is present during the line scan period of 52 $\mu$s and is not present during the entire line period of 64 $\mu$s, only 520 samples are relevant. When using a separate start-stop circuit it is possible to operate the expansion stages 21, 22 and 23 only during the said line scan period of 52 $\mu$s so that an economy in length of the sampling circuit in the stages 21, 22 and 23 is the result.

What is claimed is:

1. An arrangement for converting image signals generated in a non-interlaced manner into image signals interlaced in accordance with a television standard, comprising means for splitting the group of image signals generated in a non-interlaced manner into a first plurality of groups of alternate image signals, means coupled to said splitting means for time expanding said first plurality of signals to occur within a duration of more than one subsequent line periods, means coupled to said expending means for composing the expanded signals to form a second plurality of groups of image signals occurring in a third plurality of line periods, a store, means coupled to said store for simultaneously writing said second plurality of signals in at a given rate and each at its own location in said store and for reading out at a rate faster than said given rate, thereby providing in one group successively the second plurality of groups of image signals occurring in one line period and interlaced in accordance with the standard.

2. Arrangement as claimed in claim 1, wherein said splitting means comprises a controlled change-over switch having an input means for receiving said non-interlaced signals and three outputs; said expansion means comprising three expansion stages each having an input and an output each input coupled to a different switch output, said composing means comprising two controlled change over switches, each having three inputs and one output, the outputs of said three expansion stages being coupled to said three inputs of each of said two controlled change-over switches, said change-over switch outputs being coupled to the store having separate signal storage.

3. An arrangement as claimed in claim 2, wherein said reading and writing means comprises a clock pulse generator, serially coupled frequency dividers coupled to said generator, and signal generators coupled to said dividers and to the change-over switches.

4. An arrangement as claimed in claim 3, wherein the three expansion stages each comprise capacitors, controlled semiconductors coupled between said capacitors, said expanding means comprising three controlled change-over switches coupled to said semiconductors, and to the clock pulse generator, and a 2-to-1 divider coupled to said clock and said switches, said change-over switches having control input means coupled to one of the said signal generators for effecting consecutively within a repetition period of three line periods only one of the three change-over switches passes on the clock pulses from the generator in one line period.

5. An arrangement as claimed in claim 4, wherein the product term of the division numbers of the series-arranged frequency dividers connected to the clock pulse generator divides to the standard line frequency is equal to or is larger than a product term of twice a line scan period occurring during the line period and a desired bandwidth of the image signals to be displayed.

6. An arrangement as claimed in claim 3, further comprising an input means for receiving a synchronizing signal, a synchronizing signal generator coupled to said input means and to the store for providing a picture synchronizing signal and a field synchronizing signal.

7. An arrangement as claimed in claim 6, further comprising a frequency discriminator having a first input coupled to said synchronizing generator, an output means for providing a line synchronizing signal coupled to the clock pulse generator, and a second input coupled to one of the said frequency dividers.

8. An apparatus as claimed in claim 1, further comprising a camera coupled to said splitting means, and display arrangement coupled to said store, and a synchronizing signal generator means coupled to the camera for providing a picture synchronizing signal and a line synchronizing signal, to the store for providing a picture synchronizing signal and a field synchronizing signal and to the display arrangement for providing a field synchronizing signal.

9. A method of converting line image signals successively generated in a non-interlaced manner into image signals interlaced in accordance with a television standard, said method comprising splitting the group of image signals generated in a non-interlaced manner into a first plurality of groups of alternate image signals, time expanding each of said first plurality of groups of signals to occur within a duration of more than one subsequent line periods, composing said expanded signals to form a second plurality of groups of image signals occurring in a third plurality of line periods, simultaneously writing in at a given rate and each at its own location in a store said second plurality of signals, reading out said stored signals at a rate faster than said given rate and providing in one group successively the second plurality of groups of image signals occurring in one line period and interlaced in accordance with the standard.

10. A method as claimed in claim 9 wherein said standard has two field periods for each frame, said first plurality comprises three groups of signals, said expanded signals have a duration within two sequential line periods, said second plurality comprises two groups of signals, said third plurality of line periods comprise two line periods, and said reading rate is twice as fast as said writing rate.

* * * * *